H. P. Russ.
Stone Pavement.
No. 261. Reissued Mar. 28, 1854.
Fig. 2.
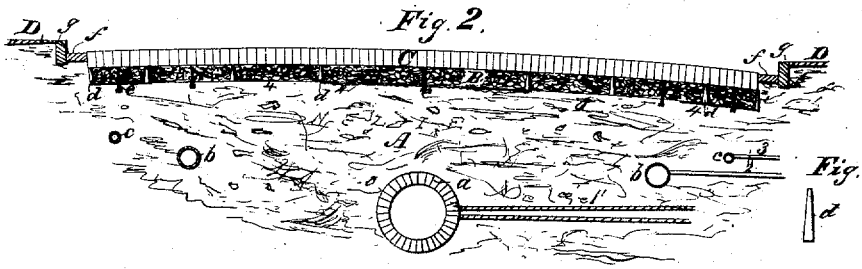
Fig. 3.
Fig 1
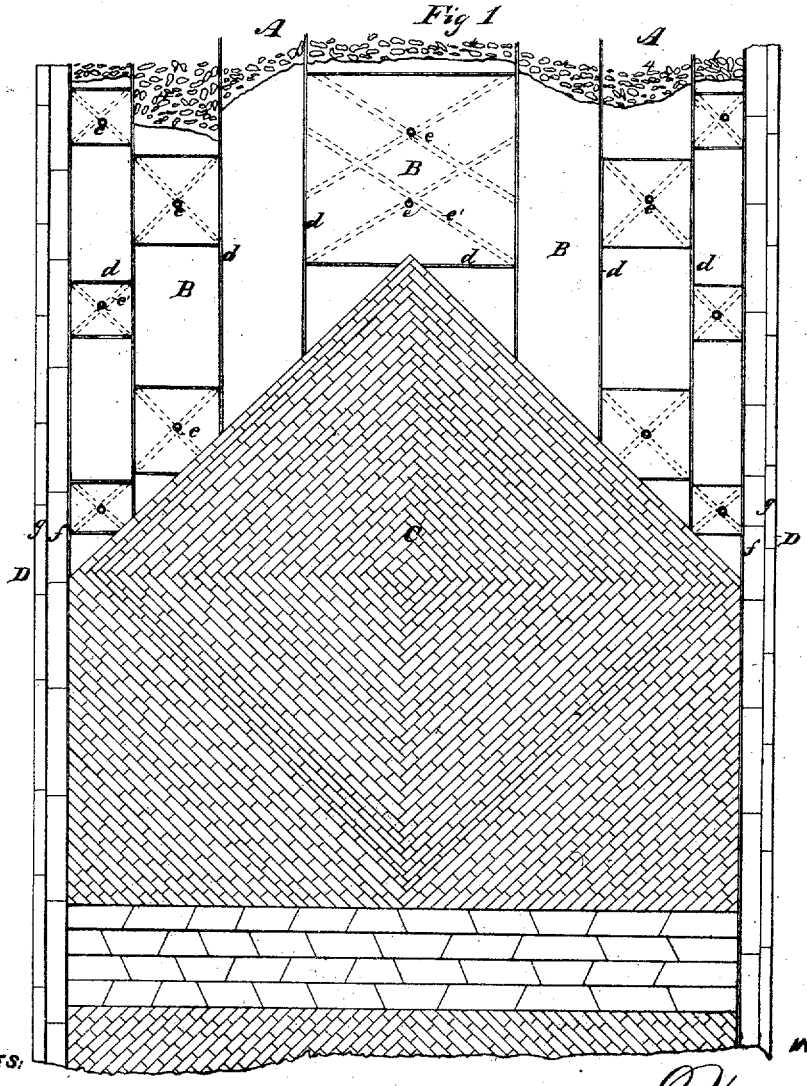
Fig. 5
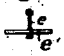
Fig. 4
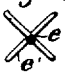
WITNESSES:
John W. Johnson
W. P. N. Fitzgerald
INVENTOR:
Horace P. Russ
THE GRAPHIC CO. PHOTO-LITH. 39 & 41 PARK PLACE, N.Y.

UNITED STATES PATENT OFFICE.

HORACE P. RUSS, OF NEW YORK, N. Y.

IMPROVEMENT IN SUBSTRATA FOR PAVEMENTS.

Specification forming part of Letters Patent No. 5,475, dated March 14, 1848; Reissue No. 261, dated March 28, 1854.

*To all whom it may concern:*

Be it known that I, HORACE P. RUSS, of the city, county, and State of New York, civil engineer, have invented and made and applied to use certain new and useful improvements in the construction and arrangement of the parts constituting the carriage-ways of streets and roads, by which, while the durability thereof is maintained and greatly increased, the means of discovering the points at which leakages occur in gas-pipes, water-pipes, &c., under the carriage-ways are fully preserved, and access can be had to sewers, water-pipes, or gas-pipes, or other needful fixtures beneath the surface and the carriage-way be replaced without injury and at little cost, for which improvements I seek Letters Patent of the United States; and I do hereby declare that the said improvements and the mode of arranging and constructing the same and the effects obtained thereby are fully and substantially set forth and shown in the following description and in the drawings annexed to and making part of this specification, wherein—

Figure 1 is a plan of a street, road, or highway formed with my improvements, and showing the progressive arrangements that commence with clearing the subsoil to receive the structure and terminate with the finish of the roadway. Fig. 2 is a section of the same across the street or road. The detached figures are separately referred to, and the same letters, numbers, and other marks of reference apply to the like parts in all the figures.

A is the subsoil, cleared to the proper depth and grade to finish the work, as required. In this *a* is a sewer, and 1 is a side drain to a culvert or dwelling. *b* are water-mains, and 2 is a supply-branch from one. *c* are gas-pipes, and 3 a supply-branch. These are all to be made and placed before or after the construction of the road above in the usual way, and are only represented herein to identify them with the indications of leakage and the means of access to them, as shown hereinafter. When the subsoil is graded and ready, a quantity of granite or other masons' or quarry chips, each from four to six or eight inches in diameter and about half that thickness, are to be laid with the flatted side upward, in the manner shown by 4 4 in Fig. 1, and rammed down flush with the grading, so as to form an open heading or partial pavement foundation for the next part of the work. This is to be proceeded in as follows:

The positions of the sewers, pipes, and branches are to be defined, and metal or wood frames, laid out in the manner shown by *d d*, thicker at the bottoms than at the tops, are to be laid down on this foundation to circumscribe a space or spaces forming a panel or panels over each sewer-pipe and branch beneath. These may be made of sound wood, though common cast-iron or iron-stone pottery, burnt earth, or any other fit material may be used for the frame-pieces in the sectional form shown in larger size in the detached Fig. 3, and placed on the graded subsoil and partial pavement. Similar strips or frames should be laid, dividing the preparatory pavement lengthwise into strips or long bats. These bats and the frames above mentioned are to be filled with what is now well known by the technical name of "concrete"—namely, a mixture of masons' chips, broken stone, hydraulic cement, clean sand, (not salt beach sand,) and fresh water—in such proportions as the quality of the cement will require to form a sound foundation, B, above the subsoil A, that will in a short time become an artificial flag or slab of rock about eight to ten inches thick to bear the pavement above; but before the mixture is placed into the panels or sections formed by the frames *d d* these panels that may hereafter have to be lifted out for access to the parts beneath are to have bars of iron laid into them, forming crosses *e'*, with holes in them, through which they are united by an eyebolt, *e*, with a ring in the head of each bolt, as shown in Figs. 4 and 5, and in the larger panels two or more of these sets of bars, bolts, and rings may be used, while in the smaller panels one will be sufficient. The bolts employed for these purposes may be of a small extra length that will find place in the subsoil, and a countersink in the face of the concrete is to receive the ring. In this way, on applying power to raise the panel, the ring will lift clear of the face without breakage or injury to the concrete. After the concrete is filled in and consolidated, it may be lifted out of any panel or section, as may be required, by shears or derricks placed above, with tackles hooked into the rings *e e* in the panel, the inverted wedge-formed portions of the frames *d d* allowing each panel of cement to be freely lifted out and placed on one side while access is needed to the part beneath, and receiving the panel of cement in replacement again when the access beneath is no longer needed.

It will be readily understood that if the surface of the subpavement were covered by one unbroken sheet of concrete several inches in thickness water or gas from the pipes below, in case leakage should occur, could not percolate or escape through the concrete, and therefore in such case it would escape into the ground under the roadway, impairing the foundations, and into the cellars and basements along the streets, causing much injury and annoyance, but not indicating the location of the breach, so that it would often be necessary to break up or "honeycomb" a great extent of pavement to discover it; but when the strips of wood or other substance above mentioned are laid at short intervals from each other, and the concrete poured in between them, the concrete in solidifying will shrink laterally and leave open seams through which the water or gas can immediately rise to the surface of the roadway, thus indicating almost the precise point at which the leakage has taken place.

When the concrete dries in the panels which are intended to be lifted out, the contraction will leave openings at the edges and around the rods which connect the crosses with the rings, which will allow the excape of water or gas, and it is obvious that such round perforations at short distances from each other throughout the concrete foundation, and especially directly over the pipes, would indicate the points at which leakages occur; but it is obvious that so far as these indications are concerned these perforations operate on the same principle with the seams above mentioned, and are scarcely so effectual, but both exist in my pavement.

The great importance of the immediate penetration of the water, gas, &c., to the surface to indicate the precise location of the breach will be readily recognized, and without it the concrete foundation would scarcely be admissible in streets. The gutter-stones *f*, curb-stones *g*, and flagging of the sidewalks D may all be laid on paneled and divided sections of concrete in the same manner and with the same advantages and effects; but in the drawings the roadway only is shown thus prepared and fitted. When the concrete foundation is fully consolidated, a pavement of granite or syenite stone blocks *c*, averaging about ten to twelve inches long, four to five inches wide, and a nearly equal depth of about ten inches, is to be carefully laid to an even surface, commencing so as to form the ranges of stones into lozenge-formed divisions, as shown in Fig. 1, by which the edges are presented diagonally to the wheel-tires of carriages or to any other passing weight. The stone over the center of each section or panel is to have two countersunk holes to receive an inverted clevis, by which it may be lifted out, so as to furnish the commencement of a removal to obtain access to the panel beneath, and this stone should be only set in clean sand, and all the rest of the stones are to be covered with sand, that must be well washed into the interstices between the stones, and then consolidated by a portion of loose grouting—that is, hydraulic cement in a sufficient quantity of water to run freely into the sand and harden between the stones. The formation of the pavement in diagonal lines with the street is to be commenced and followed up by placing the first stone of each range so that the side shall form an abutment and tie for the head or fore end of the first stone in the next range, and the dimensions of the panels or sections and paving-stones may be varied as required.

I do not claim to have invented or discovered any of the materials or parts described as used herein, all being well known; but I do claim as new and of my own invention—

1. Leaving seams or other openings in the concrete foundation, substantially in the manner described, that the direct escape of the water, gas, &c., may indicate the point or points at which repairs in the pipes are required.

2. The constructing of panels or sections in the concrete foundation B, to give access to pipes and conduits below, by the application and combination therewith of frames *d d*, formed of any suitable material, with the thinner edge upward, to allow the concrete mass to be lifted out when necessary, substantially as described, when this is combined with a paved roadway of any kind laid thereon, as described.

In witness whereof I have hereunto set my hand.

HORACE P. RUSS.

Witnesses:

SAML. GRUBB,

W. P. N. FITZGERALD.